US012573333B2

(12) United States Patent
Zhang et al.

(10) Patent No.: US 12,573,333 B2
(45) Date of Patent: Mar. 10, 2026

(54) PIXEL CIRCUIT AND DISPLAY PANEL

(71) Applicant: Wuhan China Star Optoelectronics Technology Co., Ltd., Wuhan (CN)

(72) Inventors: Zhou Zhang, Wuhan (CN); Xialing Liu, Wuhan (CN); Changwen Ma, Wuhan (CN); Zhe Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/809,374

(22) Filed: Aug. 20, 2024

(65) Prior Publication Data

US 2026/0024481 A1 Jan. 22, 2026

(30) Foreign Application Priority Data

Jul. 17, 2024 (CN) ......................... 202410962320.9

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2300/0819* (2013.01); *G09G 2300/0861* (2013.01); *G09G 2310/08* (2013.01); *G09G 2320/045* (2013.01); *G09G 2320/0693* (2013.01); *G09G 2330/12* (2013.01)

(58) Field of Classification Search
CPC ........ G09G 3/32; G09G 3/3233; G09G 3/006; G09G 2300/0426; G09G 2300/0819; G09G 2300/0852; G09G 2300/0861; G09G 2310/0286; G09G 2310/08; G09G 2320/045; G09G 2320/0233; G09G 2320/0247; G09G 2320/0693; G09G 2330/12; G09G 2340/0435; H10K 59/122; H10K 59/40; H10K 59/873; H10K 59/8792
USPC .......................................................... 345/55
See application file for complete search history.

(56) References Cited

U.S. PATENT DOCUMENTS

2009/0146987 A1* 6/2009 Kim ..................... G09G 3/3233 345/212
2013/0113779 A1* 5/2013 Yoon .................... G09G 3/3233 345/82
2013/0120228 A1* 5/2013 Yoon .................... G09G 3/3233 345/80

(Continued)

*Primary Examiner* — Tom V Sheng

(57) ABSTRACT

A pixel circuit and a display panel are provided, including a switch transistor, a driving transistor, a compensation transistor, and a calibration module. During a compensation phase, the calibration module calibrates the potential at a second node, while the compensation transistor compensates for the potential at a third node. By incorporating the compensation transistor and the calibration module within the pixel circuit, this allows for the compensation transistor to compensate the potential of the third node and the calibration module to compensate the potential of the second node during the compensation phase, achieving potential compensation of both the gate and the source of the driving transistor. This solves the problem of deviation in the potential difference between the gate and the source of the driving transistor, improves the accuracy of the wording current flowing into the light-emitting device, and enhances the display quality of the display panel.

20 Claims, 11 Drawing Sheets

(56) References Cited

U.S. PATENT DOCUMENTS

| | | | | |
|---|---|---|---|---|
| 2016/0078816 | A1* | 3/2016 | Bae | G09G 3/3266 345/215 |
| 2019/0385519 | A1* | 12/2019 | Yan | G09G 3/3233 |
| 2020/0168150 | A1* | 5/2020 | Lin | G09G 3/32 |
| 2021/0201827 | A1* | 7/2021 | Jang | G09G 3/3291 |
| 2023/0098040 | A1* | 3/2023 | Zhou | G09G 3/3233 345/55 |
| 2023/0215314 | A1* | 7/2023 | Ke | H10K 59/00 345/443 |
| 2024/0087518 | A1* | 3/2024 | He | G09G 3/3275 |
| 2024/0265870 | A1* | 8/2024 | Feng | H10K 59/131 |
| 2024/0296783 | A1* | 9/2024 | Zhang | G09G 3/3233 |
| 2024/0412690 | A1* | 12/2024 | Tanaka | G06F 3/041 |
| 2025/0095553 | A1* | 3/2025 | Lin | G09G 3/3233 |

* cited by examiner

PIXEL CIRCUIT AND DISPLAY PANEL

RELATED APPLICATION

This application claims the benefit of priority of China Patent Application No. 202410962320.9 filed on Jul. 17, 2024, the contents of which are incorporated by reference as if fully set forth herein in their entirety.

FIELD OF DISCLOSURE

The present application relates to the field of display technology, and particularly to a pixel circuit and a display panel.

DESCRIPTION OF RELATED ART

With the development of display technology, users have increasing demands for display quality, and micro light-emitting diode display technology has also entered a stage of rapid development, such as MiniLED and MicroLED, which can be collectively referred to as MLED. MLED driving technology can be divided into passive matrix (PM) driving and active matrix (AM) driving. AM-driven MLED technology has better cost advantages compared with PM-driven MLED technology.

In the current MLED display panels, due to the threshold voltage drift of thin-film transistors and the differences in the K values of different thin-film transistors, there is a deviation in the potential difference between the gate and the source of the driving transistors. This causes an offset in the working current flowing into the light-emitting devices, resulting in abnormalities in the display of the display panel.

SUMMARY OF INVENTION

The present application provides a pixel circuit and a display panel to address the technical problem of working current offset in light-emitting devices in conventional display panels.

To solve the above problem, a technical solution provided in this application is as follows:

The present application provides a pixel circuit for connection to a light-emitting device, including:

- a switch transistor, wherein a first electrode of the switch transistor is connected to a data input terminal;
- a driving transistor, wherein a first electrode of the driving transistor is connected to a second electrode of the switch transistor at a first node;
- a compensation transistor, wherein a first electrode of the compensation transistor is connected to a second electrode of the driving transistor at a second node, and a second electrode of the compensation transistor is connected to a gate of the driving transistor at a third node; and
- a calibration module, connected to the compensation transistor and the driving transistor at the second node;
- wherein the pixel circuit comprises a compensation phase and a display phase in sequence; during the compensation phase, the calibration module calibrates a potential of the second node, and the compensation transistor compensates a potential of the third node.

The present application provides a display panel. The display panel includes a pixel circuit.

BRIEF DESCRIPTION OF DRAWINGS

The following detailed description of specific embodiments of the present application, in conjunction with the accompanying drawings, will make the technical solutions and other beneficial effects of this application readily apparent.

DETAILED DESCRIPTION OF EMBODIMENTS

The technical solutions in the embodiments of the present application are clearly and completely described below in conjunction with the accompanying drawings. It should be noted that the described embodiments are only a part of the embodiments of this application, not all of the embodiments. Based on the embodiments in this application, all other embodiments that can be derived by those skilled in the art without creative effort fall within the scope of protection of the present application.

Figure 1:
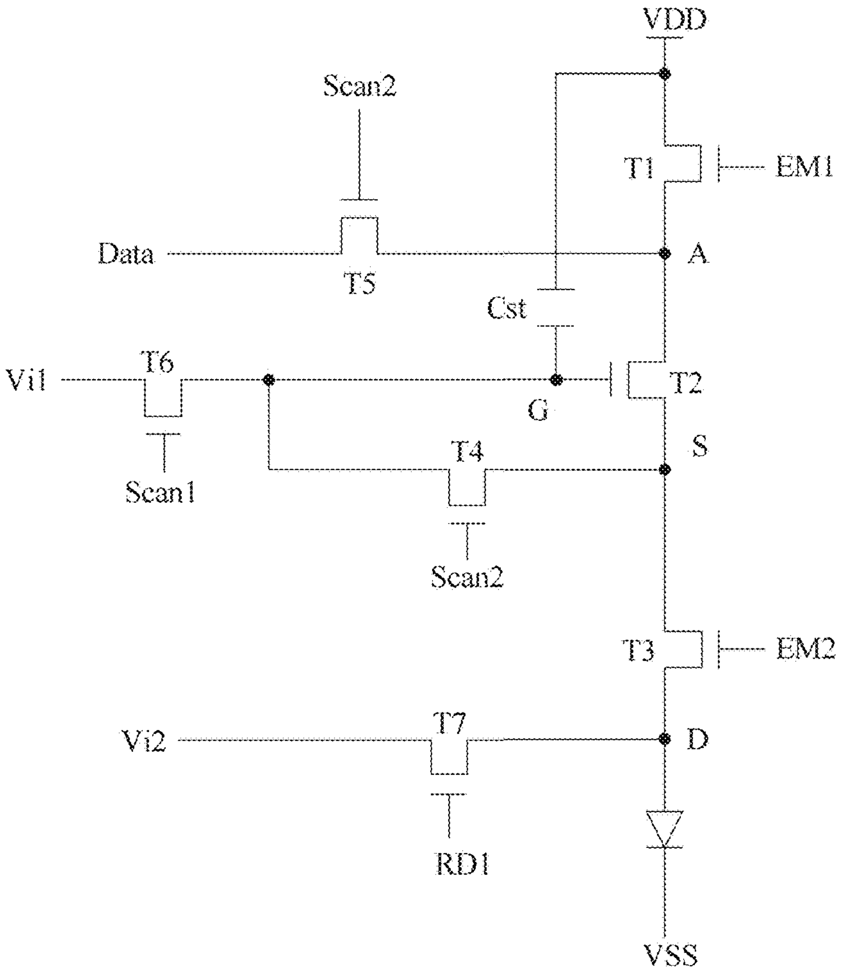
FIG. 1 shows a first circuit diagram in some embodiments of the present application.

Referring to FIG. 1, FIG. 1 shows a first circuit diagram in some embodiments of the present application.

The circuit diagram in FIG. 1 includes a driving transistor T2, a switch transistor T5, a compensation transistor T4, a first reset transistor T6, a second reset transistor T7, a first light-emitting transistor T1, and a second light-emitting transistor T3. In a data writing phase, the driving transistor T2, the switch transistor T5, and the compensation transistor T4 are turned on. The driving transistor T2 forms a diode, and the data signal input from a data input terminal Data is coupled to point Q, and the voltage at point Q is changed to the sum of Vdata and Vth to compensate for the voltage at a gate of the driving transistor T2, and complete the internal compensation of the circuit structure.

Figure 2:
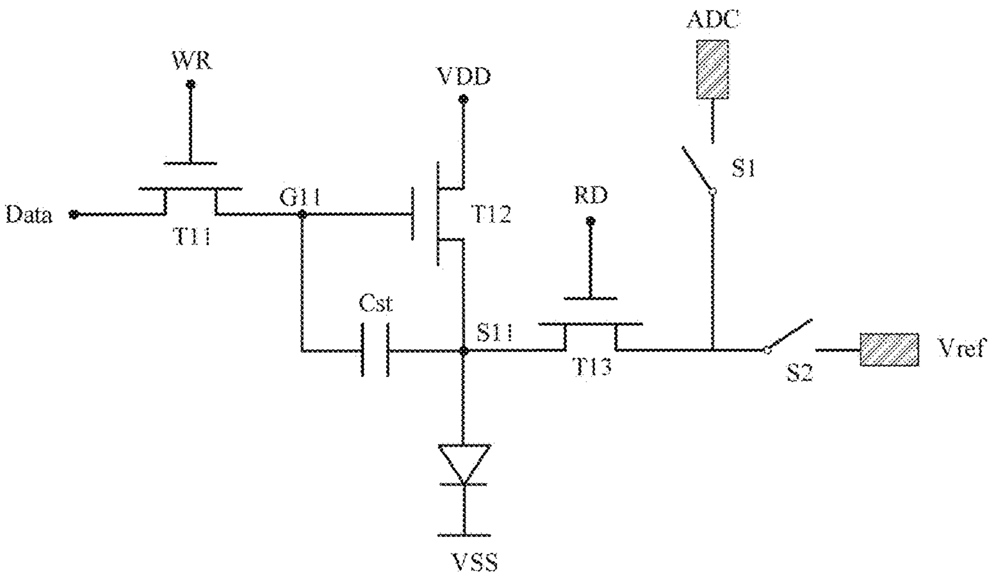
FIG. 2 shows a second circuit diagram in some embodiments of the present application.
Figure 3:
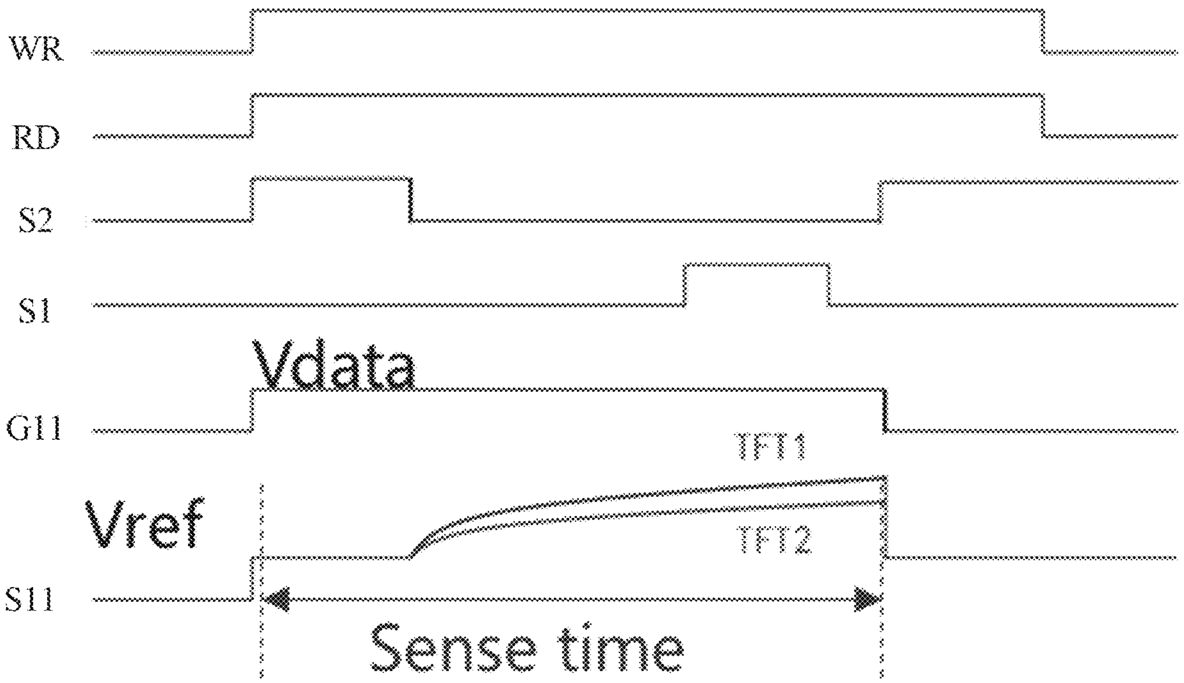
FIG. 3 shows a timing diagram of the circuit in FIG. 2 before compensation.
Figure 4:
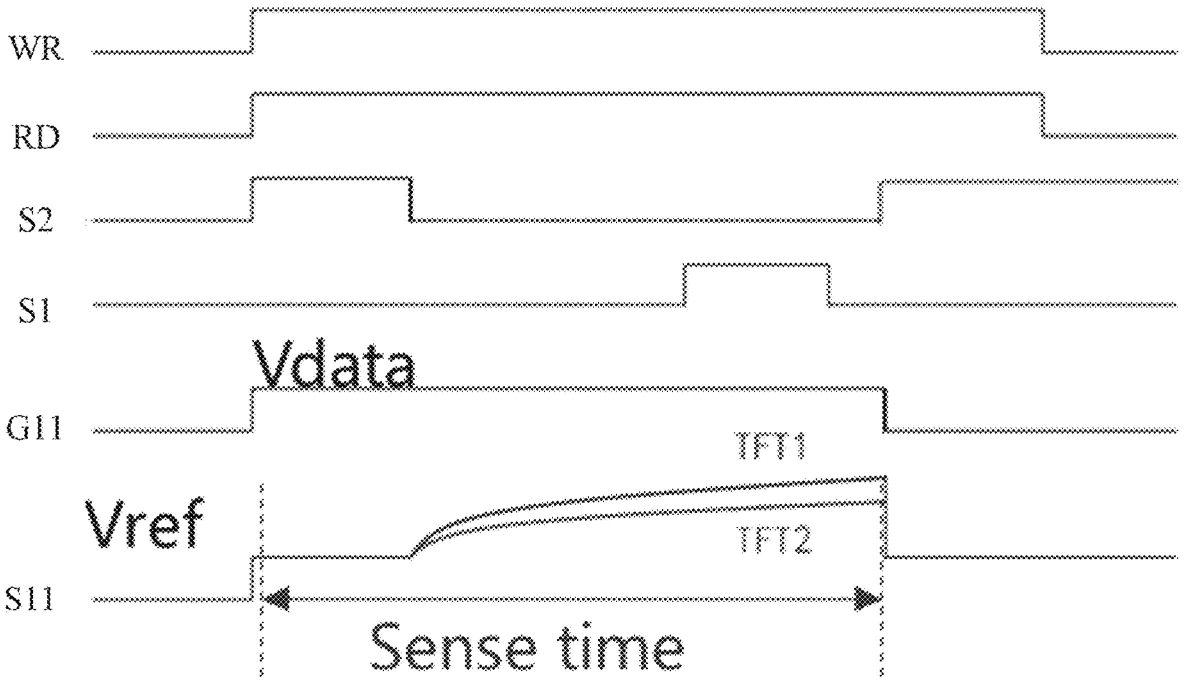
FIG. 4 shows a timing diagram of the circuit in FIG. 2 after compensation.

Referring to FIGS. 2, 3, and 4, FIG. 2 shows a second circuit diagram in some embodiments of the present application, FIG. 3 shows a timing diagram of the circuit in FIG. 2 before compensation, and FIG. 4 shows a timing diagram of the circuit in FIG. 2 after compensation.

The circuit diagram in FIG. 2 includes a first transistor T11, a second transistor T12, and a third transistor T13. The first transistor T11 and the second transistor T12 are connected to a gate node G11. The second transistor T12 and the third transistor T13 are connected to a source node S11. An end of the third transistor T13, which is farther away from the source node S11, is connected to an analog-to-digital converter (ADC) and a reference potential.

In the structure shown in FIG. 2, during threshold voltage detection of the second transistor T12, first, the first transistor T11 and the third transistor T13 are turned on, and the data voltage output from the data signal terminal is stored in the gate node G11. Then, a second switch is turned on, and the reference potential resets the potential of the source node S11. After the second switch is closed, the constant high-level voltage source VDD continuously charges the source node S11. At the same time, during a ramping process of the source node S11, the first switch is turned on to detect the potential of Vs. When the current flowing into a light-emitting device is 0, a potential difference between the source node S11 and the gate node G11 is the threshold voltage of the second transistor T12. At this time, the threshold voltage of the second transistor T12 can be obtained based on the potential difference between the source node S11 and the gate node G11.

In the structure shown by FIG. 2, during the threshold voltage compensation, K-value compensation can also be performed simultaneously. The working current before threshold voltage compensation is $Ids=K(Vgs-Vth)^2$, while the working current after threshold voltage compensation is $Ids=K(Vgs)^2$. The difference in the working current is directly proportional to K, and for different transistors, the K values are not the same. Refer to the slopes of two different transistors in FIG. 3. When the constant high-level voltage source VDD continuously charges and ramps up the source node S11, if the K values differ, the ramping slopes also differ. Therefore, different K-value compensations are required for different transistors, as specifically referred to in FIG. 4.

Moreover, in the circuit structure shown in FIG. 2, compensation for the threshold voltage of the second transistor T12 can only be performed at the initial stage. As the display screen operates, the electrical characteristics of the thin-film transistors will drift, which can also lead to display anomalies.

Therefore, the circuit structure in FIG. 1 can only perform internal threshold voltage compensation. The circuit structure in FIG. 2 can only perform initial stage threshold voltage compensation and K-value compensation, where K-value compensation requires obtaining the threshold voltage first and then synchronously calculating K based on the revised potential of the gate node G11. This compensation method is relatively complex and requires a substantial amount of algorithm resources and compensation time.

Figure 5:
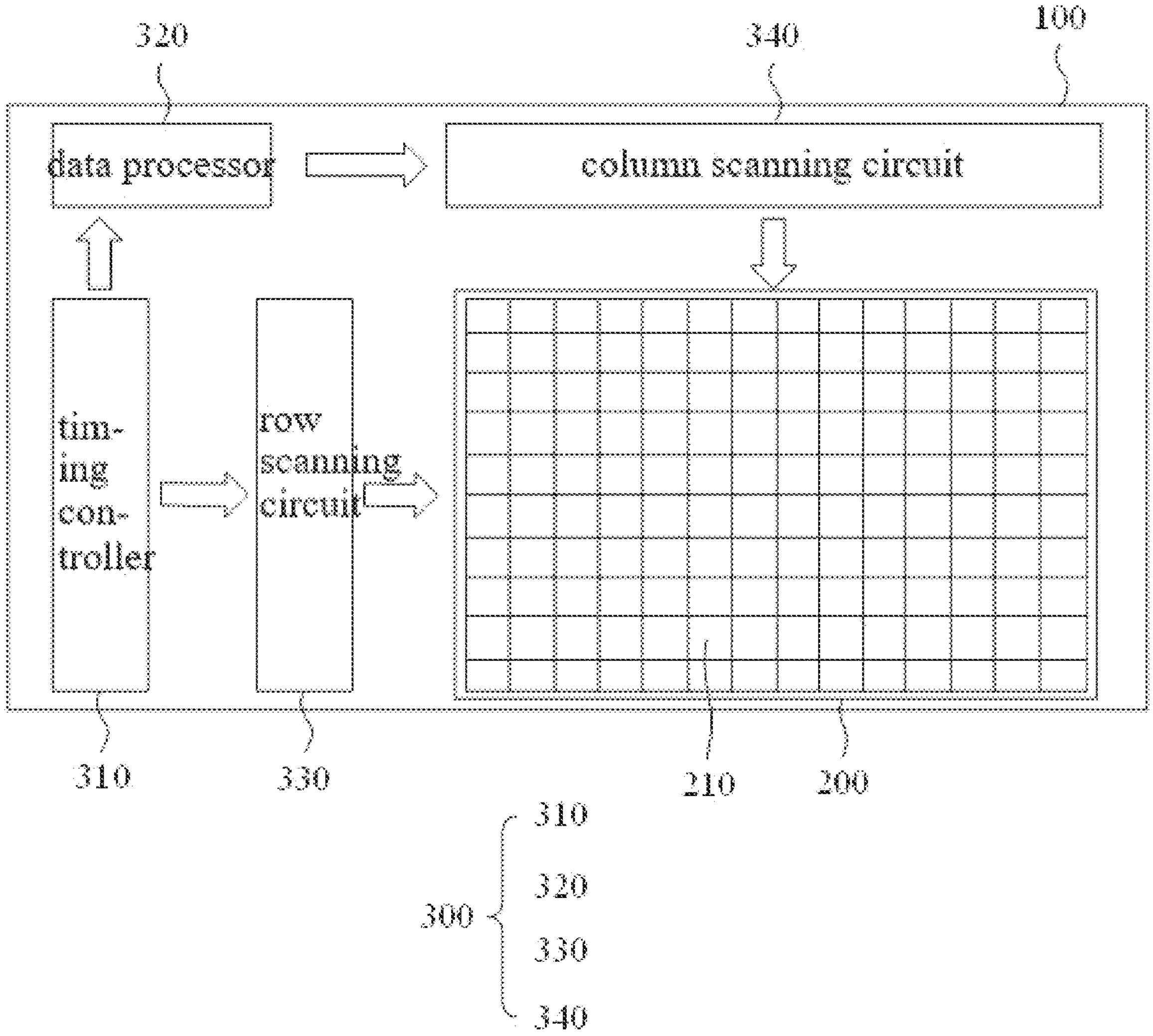
FIG. 5 shows a structural diagram of a display device according to the present application.

Referring to FIG. 5, the present application introduces a display device 100. The display device 100 includes a display panel 200 and a driving module 300. The display panel 200 includes multiple data lines and scan lines, with each data line connected to multiple data signal terminals Data, and each scan line connected to multiple scan signal terminals Scan. The data lines and the scan lines enclose multiple sub-pixels 210, each sub-pixel 210 is equipped with a pixel circuit 211 and a light-emitting device 212 connected to the pixel circuit 211.

In the structure shown in FIG. 5, the driving module 300 can include a timing controller 310, a data processor 320, a row scanning circuit 330, and a column scanning circuit 340. The timing controller 310 controls the row scanning circuit 330 to output scan signals to the display panel 200, and sends image data signals to the data processor 320. The data processor 320 transmits data voltage signals to the column scanning circuit 340 based on these image data signals.

It should be noted that the row scanning circuit 330 and/or the column scanning circuit 340 can also be directly integrated within the display panel 200.

Figure 6:
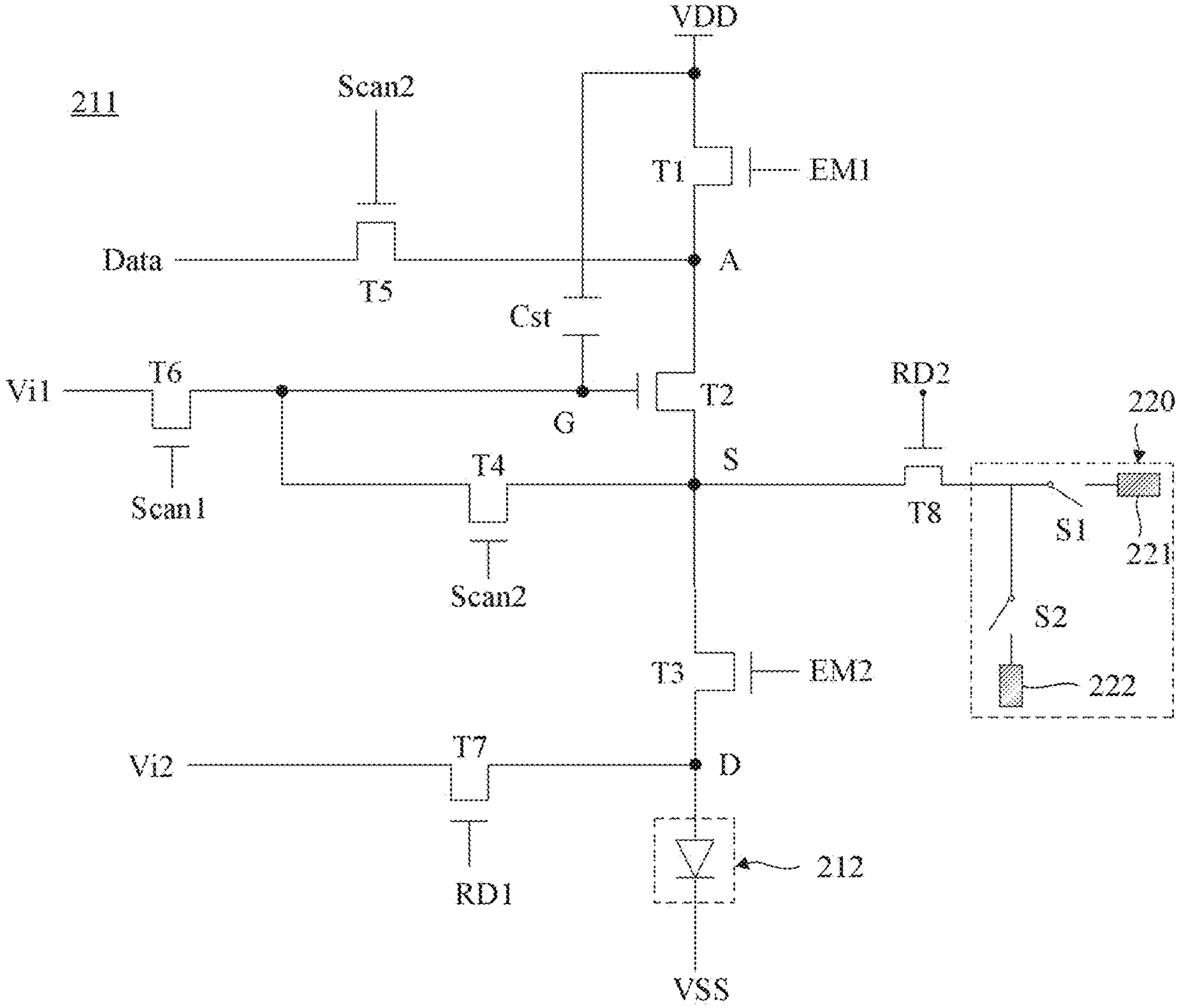
FIG. 6 shows a diagram of a pixel circuit of the display device according to the present application.

Referring to FIG. 6, the pixel circuit 211 includes interconnected components: a switch transistor T5, a driving transistor T2, a compensation transistor T4, and a calibration module 220.

In this embodiment, a first electrode of the switch transistor T5 is connected to the data input terminal Data, a first electrode of the driving transistor T2 is connected to a second electrode of the switch transistor T5 at a first node A, a first electrode of the compensation transistor T4 is connected to a second electrode of the driving transistor T2 at a second node S, and a second electrode of the compensation transistor T4 is connected to a gate of the driving transistor T2 at a third node G. The calibration module 220 is connected to the compensation transistor T4 and the driving transistor T2 at the second node S.

In the present embodiment, the pixel circuit 211 includes a continuous compensation phase Ta and a display phase Tb. During the compensation phase Ta, the calibration module 220 is used to calibrate the potential of the second node S, and the compensation transistor T4 is used to compensate the potential of the third node G.

By integrating the compensation transistor T4 and the calibration module 220 within the pixel circuit 211, the compensation transistor T4 compensates for the potential of the third node G during the compensation phase Ta, and the calibration module 220 compensates for the potential of the second node S. This setup also achieves compensation for the potential at both the gate and the source of the driving transistor T2, addressing the issue of potential deviation between the gate and the source of the driving transistor T2. This enhancement improves the accuracy of the working current flowing into the light-emitting device 212 and improves the display performance of the display panel.

Below is a description of the technical solutions of the present application based on specific embodiments.

Referring to FIG. 6, the pixel circuit 211 can include a first reset transistor T6, with a first electrode of the first reset transistor T6 connected to a first reset line Vi1, a second electrode of the first reset transistor T6 connected to the third node G, and a gate of the first reset transistor T6 connected to a first control signal line Scan1. The first reset transistor T6 is used to reset the potential of the third node G.

Referring to FIG. 6, the pixel circuit 211 further includes a second reset transistor T7, with a first electrode of the second reset transistor T7 connected to a second reset line Vi2, a second electrode of the second reset transistor T7 connected to an anode of the light-emitting device 212, and a gate of the second reset transistor T7 connected to a second control signal line RD1. The second reset transistor T7 is used to reset the potential of the anode of the light-emitting device 212.

Referring to FIG. 6, the pixel circuit 211 further includes a first light-emitting transistor T1 and a second light-emitting transistor T3. A first electrode of the first light-emitting transistor T1 is connected to a first potential line VDD, a second electrode of the first light-emitting transistor T1 is connected to the first node A, and a gate of the first light-emitting transistor T1 is connected to a first light control line EM1. Meanwhile, a first electrode of the second light-emitting transistor T3 is connected to the second node S, a second electrode of the second light-emitting transistor T3 is connected to the anode of the light-emitting device 212, and a gate is connected to a second light control line EM2.

It should be noted that during the compensation phase Ta, the first light control line EM1 controls the first light-emitting transistor T1 to turn on, and the second light control line EM2 controls the second light-emitting transistor T3 to turn off. During a light-emitting period of the display phase Tb, the first light control line EM1 controls the first light-emitting transistor T1 to turn on, and the second light control line EM2 controls the second light-emitting transistor T3 to turn on. That is, with the first light-emitting transistor T1 on, the compensation transistor T4 compensates the potential of the gate of the driving transistor T2 during this phase. When the second light-emitting transistor T3 is on, the working current flows through the second light-emitting transistor T3 into the light-emitting device 212 to drive the light-emitting device 212 to emit light.

In the present embodiment, a gate of the switch transistor T5 and a gate of the compensation transistor T4 are both connected to a third control signal line Scan2. Additionally, the first control signal line Scan1 and the third control signal line Scan2 transmit different stages of the same type of control signal; for example, the first control signal line Scan1 transmits an (n−1)th stage Scan signal, while the third control signal line Scan2 transmits an n stage Scan signal.

Referring to FIG. 5, the calibration module 220 includes a calibration transistor T8, a measuring element 221, and a calibration element 222. A first electrode of the calibration element 222 is connected to the second node S, there is a first switch S1 between the measuring element 221 and a second electrode of the calibration transistor T8, and a second switch S2 between the calibration element 222 and the second electrode of the calibration transistor T8, with a gate of the calibration transistor T8 connected to a fourth control signal line RD2.

In the present embodiment, the calibration element 222 is used to calibrate the potential of the second node S to the reference potential Vref, and the measuring element 221 is used to obtain the potential of the second node S.

It should be noted that due to possible measurement errors in node potential detection, to ensure the accuracy of node potential detection, an operating duration of the first switch S1 is longer than an operating duration of the second switch S2 during the compensation phase Ta. This effectively increases the duration of potential detection for the second node S, thereby enhancing the accuracy of the potential detection at the second node S.

It should also be noted that since the compensation phase Ta requires simultaneous compensation of the gate potential and calibration of the source potential of the driving transistor T2, the pulse width of the compensation phase Ta needs to be greater than the pulse width of the display phase Tb.

Furthermore, the calibration element 222 can act as a constant voltage source outputting the reference potential Vref, mainly used to reset the potential of the second node S to the reference potential Vref, and the measuring element 221 can be an Analog-to-Digital Converter (ADC), which can directly obtain the potential of the second node S.

Referring to FIG. 6, the pixel circuit 211 also includes a second potential line VSS, which is connected to a cathode of the light-emitting device 212.

Referring to FIG. 6, the pixel circuit 211 also includes a bootstrap capacitor Cst, one end of the bootstrap capacitor Cst is connected to the first potential line VDD, and the other end of the bootstrap capacitor Cst is connected to the third node G.

It should be noted that the first potential line VDD can be a high potential line, and the second potential line VSS can be a low potential line.

It should also be noted that the first electrode can be either the source or the drain, and the second electrode can be the other of the source or the drain.

It should be noted that the first reset line Vi1 and the second reset line Vi2 are used to output reset signals, which are constant voltage.

It should be noted that the switch transistor T5, the driving transistor T2, the compensation transistor T4, the first reset transistor T6, the second reset transistor T7, the first light-emitting transistor T1, the second light-emitting transistor T3, and the calibration transistor T8 can be either N-type or P-type transistors, with the following explanation assuming N-type transistors.

Figure 7:
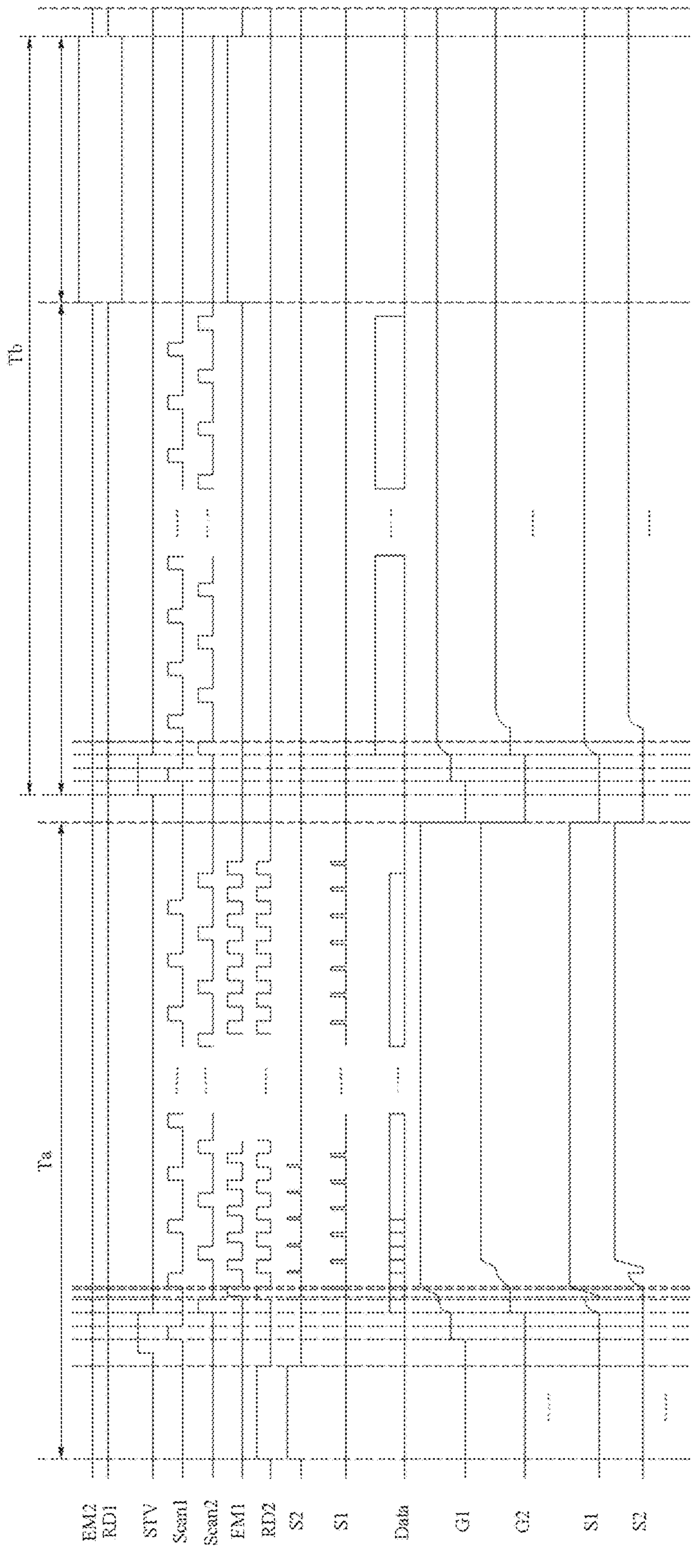
FIG. 7 shows a timing diagram of the pixel circuit in FIG. 6.

Referring to FIG. 7, a display frame of the pixel circuit 211 can include a compensation phase Ta and a display phase Tb. The compensation phase Ta mainly involves the correction of the potential of the source and the gate of the driving transistor T2, while the display phase Tb is primarily used for the light-emitting device 212 to emit light.

Figure 8A:
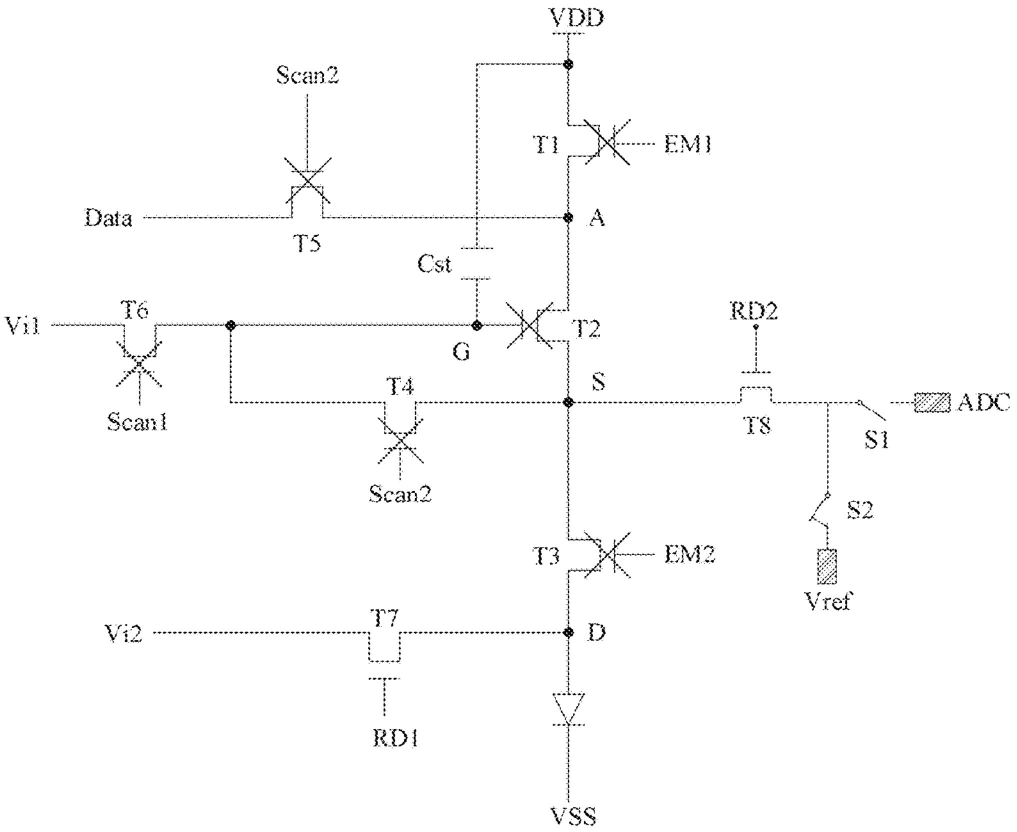
FIGS. 8A to 8F show working process diagrams of the pixel circuit in FIG. 6 during each sub-phase of a compensation phase.
Figure 9:
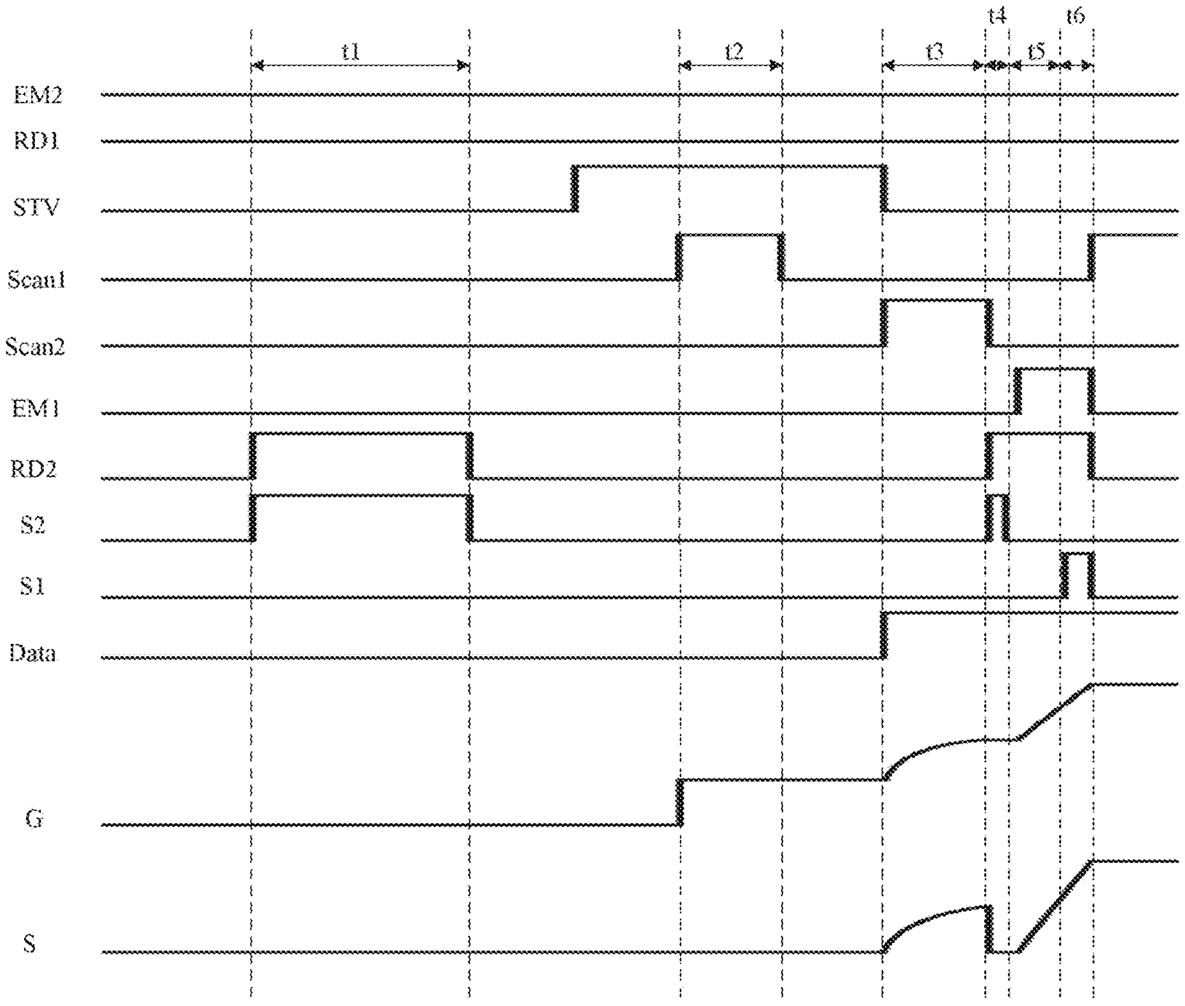
FIG. 9 shows a partial timing diagram of each transmission line of the pixel circuit in FIG. 7 during the compensation phase.

Referring to FIGS. 8A and 9, in a first sub-phase t1 of the compensation phase Ta, the first control signal line Scan1, the first light control line EM1, the second light control line EM2, and the third control signal line Scan2 all output low levels, thus turning off the first reset transistor T6, the first light-emitting transistor T1, the second light-emitting transistor T3, the compensation transistor T4, and the switch transistor T5; simultaneously, the second control signal line RD1 outputs a high level, turning on the second reset transistor T7, resetting the anode potential of the light-emitting device 212 to the first potential V1. Additionally, the fourth control signal line RD2 outputs a high level, turning on the calibration transistor T8, and the second switch S2 is closed, which resets the potential of the second node S to the reference potential Vref.

Figure 8B:
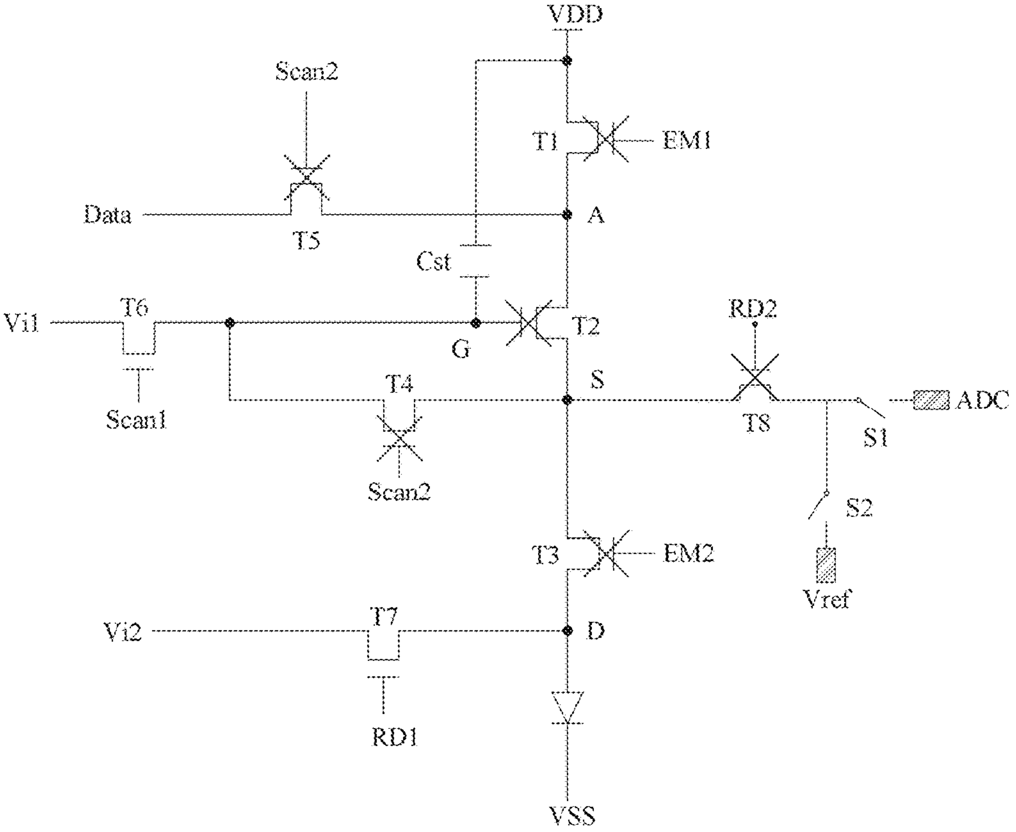

Refer to FIGS. 8B and 9. During a second sub-phase t2 of the compensation phase Ta, the first light control line EM1, the second light control line EM2, the third control signal line Scan2, and the fourth control signal line RD2 all output low levels, thereby turning off the first light-emitting transistor T1, the second light-emitting transistor T3, the compensation transistor T4, the switch transistor T5, and the calibration transistor T8. Simultaneously, the second control signal line RD1 outputs a high level, turning on the second reset transistor T7, which maintains the anode potential of the light-emitting device 212 at the first potential V1. The first control signal line Scan1 outputs a high level, turning on the first reset transistor T6, which resets the potential of the third node G to the second potential V2 and maintains the potential of the second node S at the reference potential Vref.

Figure 8C:
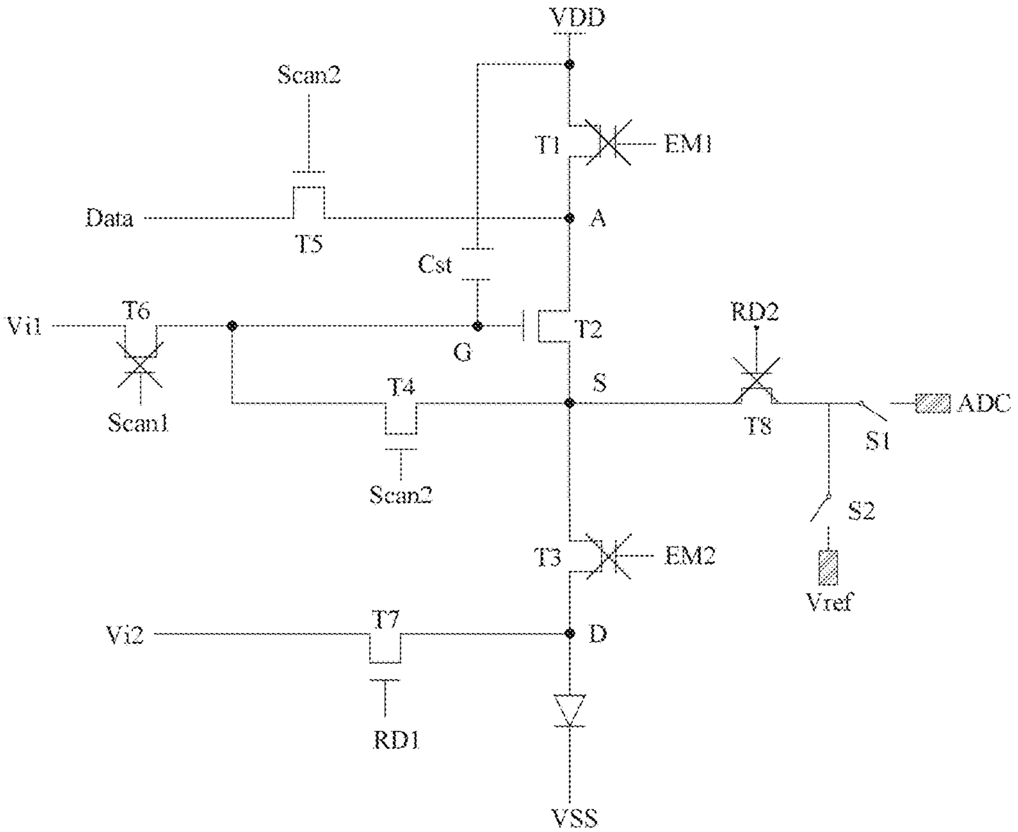

Please refer to FIGS. 8C and 9. In a third sub-phase t3 of the compensation phase Ta, the first control signal line Scan1, the first light control line EM1, the second light control line EM2, and the fourth control signal line RD2 all output low levels. This turns off the first reset transistor T6, the first light-emitting transistor T1, the second light-emitting transistor T3, and the calibration transistor T8. Simultaneously, the second control signal line RD1 outputs a high level, turning on the second reset transistor T7 and maintaining the anode potential of the light-emitting device 212 at the first potential V1. The third control signal line Scan2 outputs a high level, turning on the driving transistor T2, the switch transistor T5, and the compensation transistor T4. The data voltage Vdata, output from the data signal line, passes through the driving transistor T2 and the switch transistor T5 to the second node S, elevating the potential of the second node S from the reference potential Vref to Vdata. This action compensates for the potential at the gate of the driving transistor T2, raising the potential of the third node G from the second potential V2 to the combined sum of Vdata and Vth.

Figure 8D:
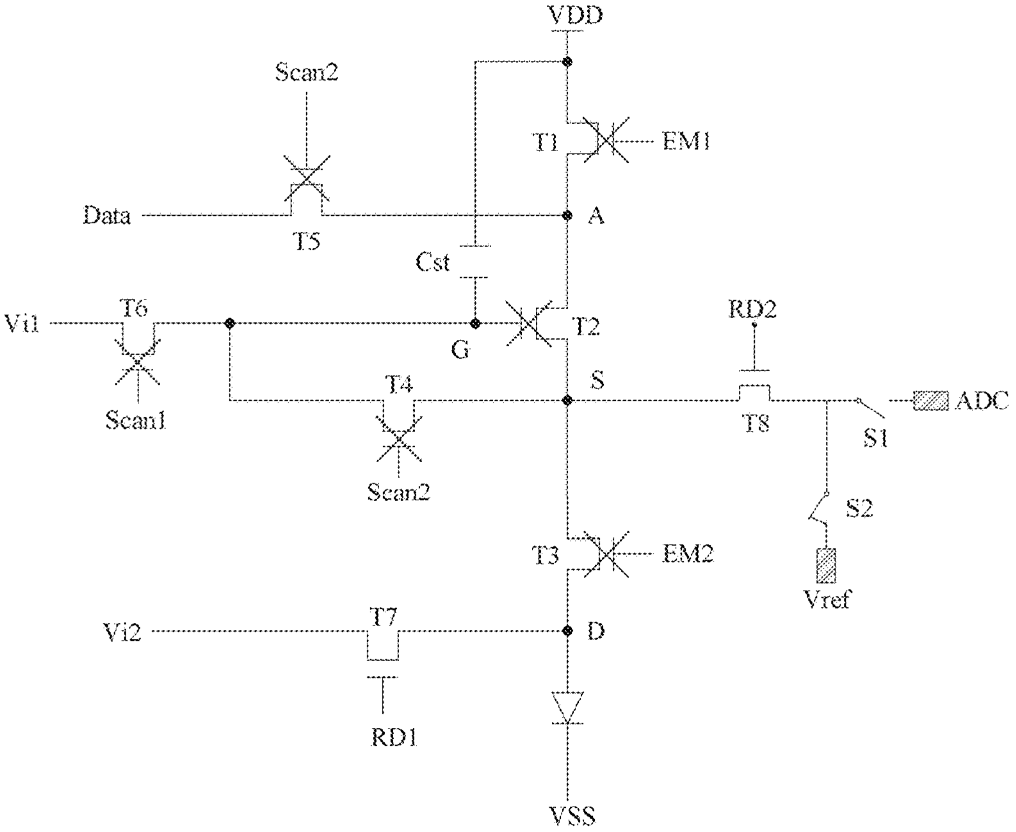

Please refer to FIGS. 8D and 9. In a fourth sub-phase t4 of the compensation phase Ta, the first control signal line Scan1, the first light control line EM1, the second light control line EM2, and the third control signal line Scan2 all output low levels. This action turns off the first reset transistor T6, the first light-emitting transistor T1, the second light-emitting transistor T3, the compensation transistor T4, and the switch transistor T5. Simultaneously, the second control signal line RD1 outputs a high level, turning on the second reset transistor T7 and maintaining the anode potential of the light-emitting device 212 at the first potential V1. Additionally, the fourth control signal line RD2 outputs a high level, turning on the calibration transistor T8, and the second switch S2 is closed, which resets the potential of the second node S to the reference potential Vref. Meanwhile, the potential of the third node G remains at the sum of Vdata and Vth.

Figure 8E:
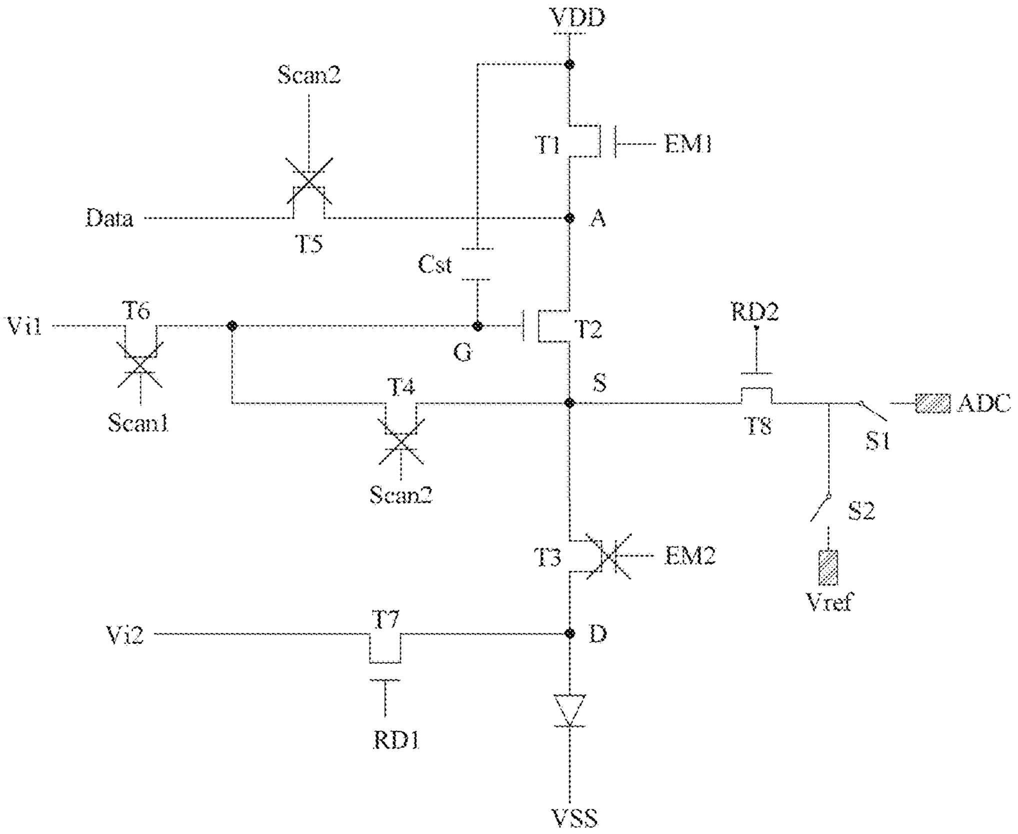

Please refer to FIGS. 8E and 9. In a fifth sub-phase t5 of the compensation phase Ta, the first control signal line Scan1, the second light control line EM2, and the third control signal line Scan2 all output low levels, turning off the first reset transistor T6, the second light-emitting transistor T3, the compensation transistor T4, and the switch transistor T5. Simultaneously, the second control signal line RD1 outputs a high level, turning on the second reset transistor T7 and maintaining the anode potential of the light-emitting device 212 at the first potential V1. The fourth control signal line RD2 also outputs a high level, turning on the calibration transistor T8; however, since both the first switch S1 and the second switch S2 are inactive, the calibration unit 222 cannot maintain the potential of the second node S at the reference potential Vref. Subsequently, the first light control line EM1 outputs a high level, turning on the first light-emitting transistor T1 and transferring the high level from the first potential line VDD to the first node A. At this point, the gate of the driving transistor T2 is in a floating state, causing the transistor T2 to turn on, and due to the bootstrap effect from the bootstrap capacitor Cst, the potentials of the second node S and the third node G increase over time.

Figure 8F:
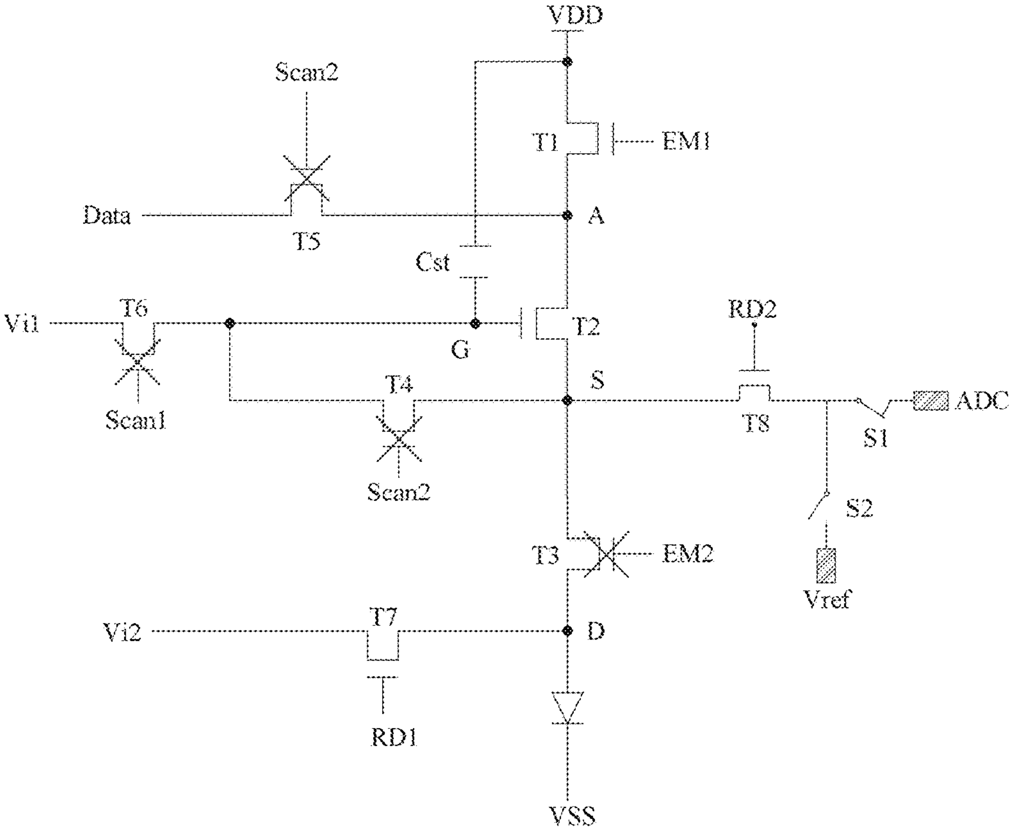

Refer to FIGS. 8F and 9, in a sixth sub-phase t6 of the compensation phase Ta, the first control signal line Scan1, the second light control line EM2, and the third control signal line Scan2 all output low levels, turning off the first reset transistor T6, the second light-emitting transistor T3, the compensation transistor T4, and the switch transistor T5; simultaneously, the second control signal line RD1 outputs a high level, turning on the second reset transistor T7, maintaining the anode potential of the light-emitting device 212 at the first potential V1; subsequently, the first light control line EM1 outputs a high level, turning on the first light-emitting transistor T1, transmitting the high level of the first potential line VDD to the first node A, at this time the gate of the driving transistor T2 is in a floating state, thereby turning on the driving transistor T2, and due to the bootstrap effect of the bootstrap capacitor Cst, the potentials of the second node S and the third node G increase over time; again, the fourth control signal line RD2 outputs a high level, turning on the calibration transistor T8, but since the first switch S1 is active, the measuring element 221 monitors the potential of the second node S in real-time, and the data signal Vdata output from the data input terminal of the second node S changes to Vdata*, to compensate for the potential of the source of the driving transistor T2 in the pixel circuit 211.

It should be noted that due to the effects of resistance, capacitance, and leakage current, even when the potential of the source of the driving transistor T2 is reset to the reference potential Vref, there still exists a certain deviation. Therefore, this application compensates for the difference in the potential of the source of the driving transistor T2 by updating the data voltage input at the data input terminal Data.

Below, the compensation principle during the compensation phase of the present application is described using the following formulas:

Before the compensation phase, the working current is given by Equation (1): $Ids=K*(Vdata-Vs)^2$;

Detecting the charging of the capacitor is described by Equation (2): Ids*dt=Csen*dVs;

Substituting Equation (1) into Equation (2) yields Equation (3): $K/Csen*dt=dVs/(Vdata-Vs)^2$;

Since the voltage difference between the third node G and the second node S is a constant, i.e., the difference between the data voltage Vdata and the reference voltage Vref is constant, Equation (3) can be transformed into Equation (4):

$$K*t/Csen=(Vs-Vref)/(Vdata-Vref)^2;$$

Assuming the compensated K value changes to Ktrg, then during the detection phase, the voltage at the second node S rises from the original Vs to the preset voltage Vtrg. For a driving transistor DTn within a certain sub-pixel, the voltage at the second node S detected as Vsn, and substituting Vtrg and Vsn into Equation (4) gives Equation (5):

$$\frac{Ktrg*t}{Csen}=\frac{Vtrg-Vref}{(Vdata-Vref)^2};$$

And Equation (6):

$$\frac{Kn*t}{Csen}=\frac{Vsn-Vref}{(Vdata-Vref)^2},$$

From Equations (5) and (6), Equation (7) is derived:

$$\sqrt{\frac{Ktrg}{Kn}}=\sqrt{\frac{Vtrg-Vref}{Vsn-Vref}}$$

Therefore, the updated data voltage is:

$$Vdata''=\sqrt{\frac{Ktrg}{Kn}}*Vdata+Vref;$$

At the same time, Vdata" is updated algorithmically at the data input terminal to achieve compensation for the K value.

It should be noted that in the structure shown in FIG. 7, G1 and S1 represent the voltages of the gate and the source of the driving transistor T2 in one pixel circuit 211 of the display panel, while G2 and S2 represent the voltages of the gate and the source of the driving transistor T2 in another pixel circuit 211 of the display panel. Similarly, during the compensation phase, the present application can obtain voltages of the gate and the source of the driving transistor T2 in each pixel circuit 211, and compensate the K value of the driving transistor T2 in different pixel circuits 211 based on these voltages.

It should also be noted that in the present application, Vth is the threshold voltage of the driving transistor T2, Vg is the gate voltage of the driving transistor T2, Vs is the source voltage of the driving transistor T3, Vgs is the voltage difference between the gate and the source of the driving transistor T3, and Vdata is the voltage input to the pixel circuit 211 from the data input terminal Data.

Figure 11:
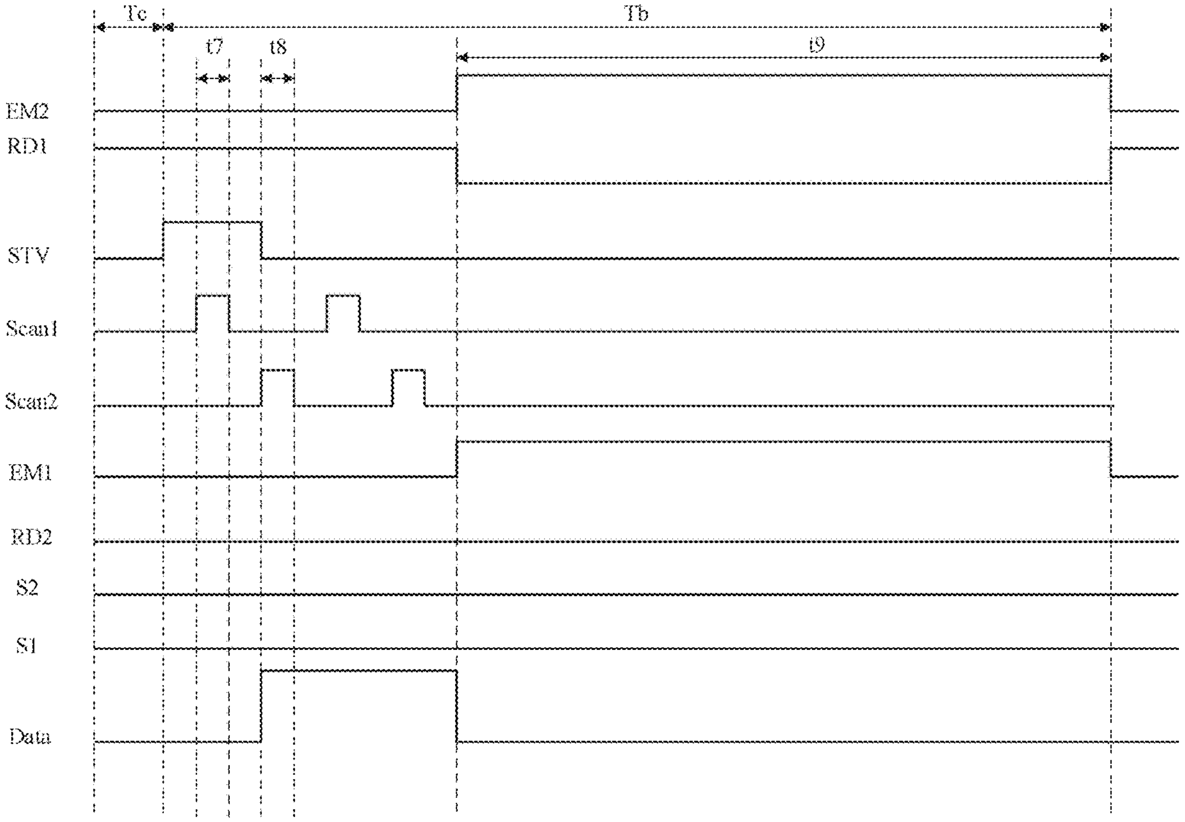
FIG. 11 shows a partial timing diagram of each transmission line of the pixel circuit in FIG. 7 during the display phase.

Please refer to FIG. 11, which shows a partial timing diagram of the transmission lines in FIG. 7 during the display phase. In a transition phase Tc between the display phase Tb and the compensation phase Ta, the potentials of the internal nodes of the pixel circuit 211 are all initialized to their initial potentials.

Figure 10A:
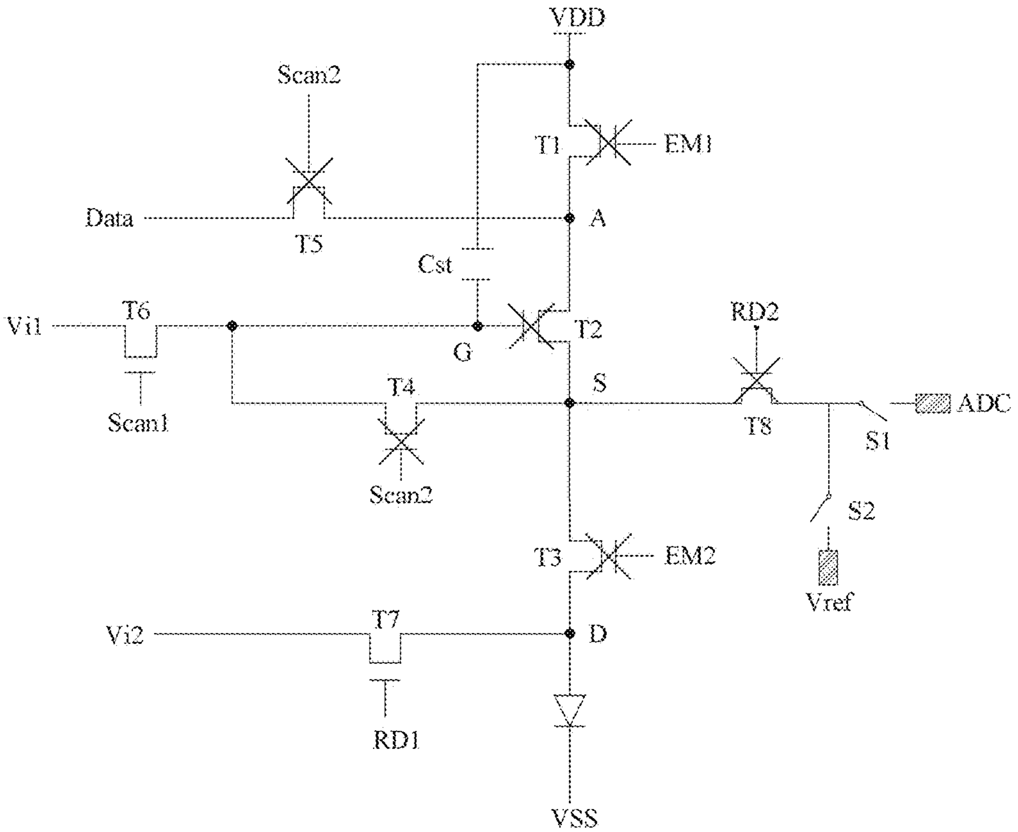
FIGS. 10A to 10C show working process diagrams of the pixel circuit in FIG. 6 during each sub-phase of a display phase.

Refer to FIGS. 11 and 10A, in a first sub-phase t7 of the display phase Tb, the first light control line EM1, the second light control line EM2, the third control signal line Scan2, and the fourth control signal line RD2 all output low levels, turning off the first light-emitting transistor T1, the second light-emitting transistor T3, the compensation transistor T4, the switch transistor T5, and the calibration transistor T8; simultaneously, the second control signal line RD1 outputs a high level, turning on the second reset transistor T7, maintaining the anode potential of the light-emitting device 212 at the first potential V1. The first control signal line Scan1 outputs a high level, turning on the first reset transistor T6, resetting the potential of the third node G to the second potential V2, while the potential of the second node S is maintained at the initial position, that is, the reference potential Vref.

Figure 10B:
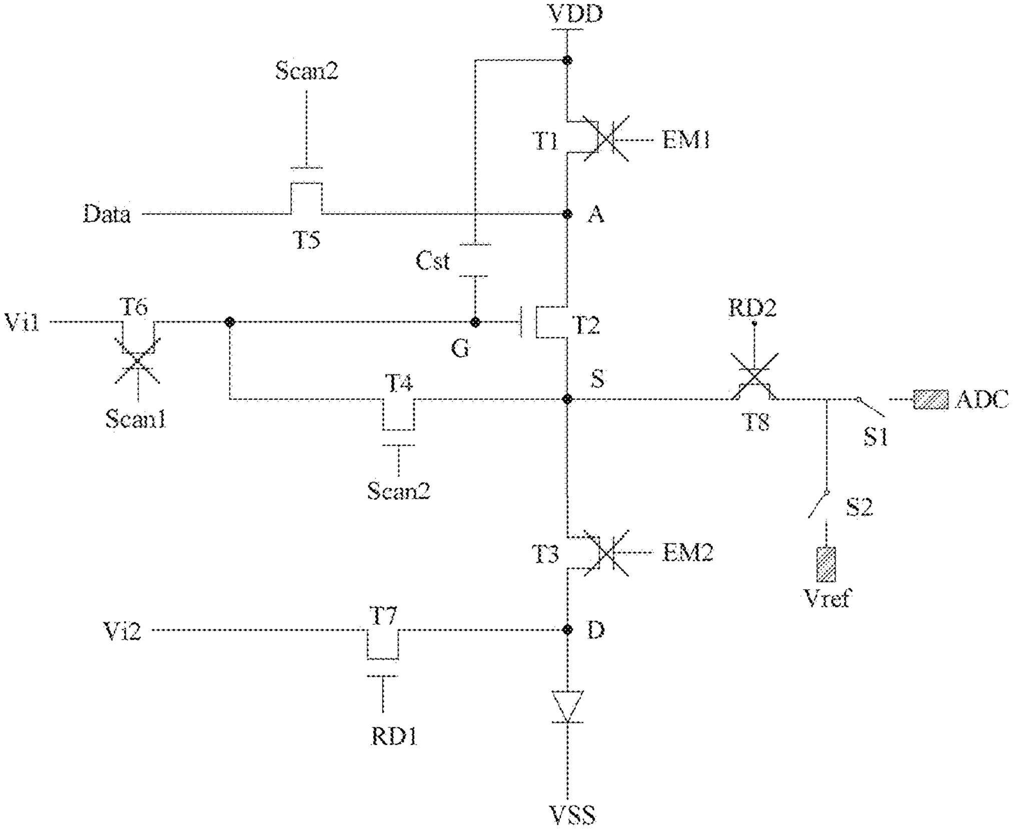

Refer to FIGS. 11 and 10B, in a second sub-phase t8 of the display phase Tb, the first control signal line Scan1, the first light control line EM1, the second light control line EM2, and the fourth control signal line RD2 all output low levels, turning off the first reset transistor T6, the first light-emitting transistor T1, the second light-emitting transistor T3, and the calibration transistor T8; simultaneously, the second control signal line RD1 outputs a high level, turning on the second reset transistor T7, maintaining the anode potential of the light-emitting device 212 at the first potential V1. The third control signal line Scan2 outputs a high level, turning on the driving transistor T2, the switch transistor T5, and the compensation transistor T4. The updated data voltage Vdata, combined with Vth and output from the data signal line, passes through the driving transistor T2 and the switch transistor T5 to the second node S, increasing the potential of the second node S from the reference potential Vref to the combined sum of Vdata and Vth.

Figure 10C:
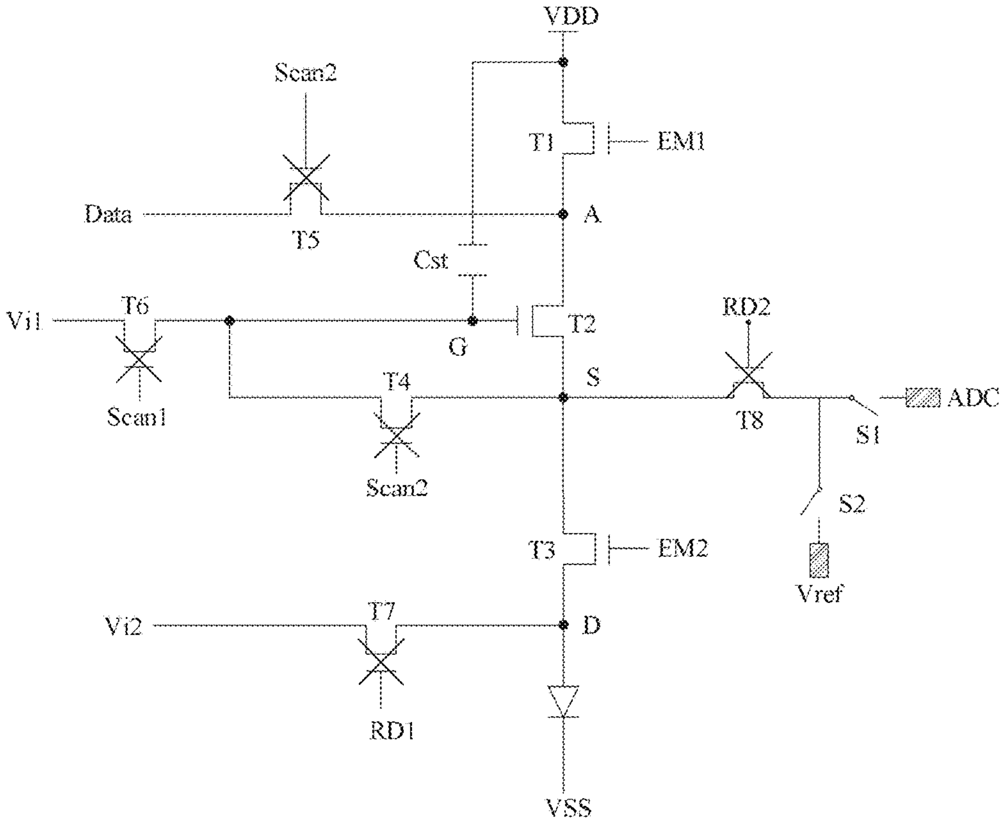

Refer to FIGS. 11 and 10C, in a third sub-phase t9 of the display phase Tb, the first control signal line Scan1, the second control signal line RD1, the third control signal line Scan2, and the fourth control signal line RD2 all output low levels, turning off the first reset transistor T6, the second reset transistor T7, the compensation transistor T4, the switch transistor T5, and the calibration transistor T8; subsequently, the first light control line EM1 and the second light control line EM2 output high levels, turning on the first light-emitting transistor T1 and the second light-emitting transistor T3. Simultaneously, the potential of the third node G activates the driving transistor T2, and the bootstrap capacitor Cst discharges and maintains the potential of the third node G at the sum of Vdata and Vth, causing the light-emitting device 212 to emit light.

It should be noted that during the compensation phase Ta, the potential of the third node G has already been compensated. Therefore, in the second sub-phase t8 of the display phase Tb, based on the corrected K value, the input voltage at the data input terminal Data can be directly revised, that is, directly inputting the sum of Vdata and Vth.

It should also be noted that during the display phase Tb, the compensation transistor T4 is used to compensate for the potential of the third node G. Specifically, in the second sub-phase t8 of the display phase Tb, since the input voltage from the data input terminal is the sum of Vdata and Vth, the potential of the third node G in the display phase Tb immediately following the compensation phase Ta is directly changed to the sum of Vdata and Vth, eliminating the need for compensation of the voltage at the third node G; however, in subsequent display frames, due to the drift of the threshold voltage, it is still necessary to compensate the voltage at the third node G to the sum of Vdata and Vth corresponding to the display frame.

It should also be noted that the compensation phase Ta of the present application can occur only during the activation or deactivation of the display panel 100, or in a particular display frame within each display frame or a series of continuous display frames.

It should be noted that during the compensation phase Ta of the present application, the data voltage input from the data input terminal Data to each pixel circuit 211 is the same, to ensure that each sub-pixel 210 is compensated for the K value on the same basis. However, during the display phase Tb of this application, due to differences in the displayed images, the data voltage input from the data input terminal Data to each pixel circuit 211 can be adjusted based on the differences in the image data.

In some embodiments of the present application, such as the structure shown in FIG. 1, only a compensation transistor T4 is set inside the pixel circuit 211 to compensate for the gate terminal potential of the driving transistor T2, but the calibration module 220 shown in FIG. 6 is not included. Consequently, this results in inaccuracies in the potential of the second node S, leading to deviations in the output working current. In other embodiments, such as the structure shown in FIG. 2, the pixel circuit 211 does not include a compensation transistor T4 but only includes a calibration module 220. However, when updating the potential of the second node S, the calibration module 220 needs to correct based on the gate potential of the driving transistor T2. The inaccuracy of the gate potential necessitates initial acquisition of the threshold voltage and synchronous calculation of K based on the revised potential of the gate node. This method of compensation is relatively complex and requires considerable algorithmic resources and time for compensation.

In the present embodiment, the present application achieves improved accuracy in correcting the potential of the source of the driving transistor T2 by simultaneously incorporating both the compensation transistor T4 and the calibration module 220 within the pixel circuit 211. It uses the compensation transistor T4 to also correct the gate potential of the driving transistor T2, as well as to compensate the K value. This enhances the accuracy of the potential correction of the source of the driving transistor T2; and during the display phase Tb, the compensation transistor T4 is used again to correct the gate potential of the driving transistor T2, thereby compensating both the gate and source potentials of the driving transistor T2 within a single display frame. This addresses the problem of deviations in the potential difference between the gate and the source of the driving transistor T2, improves the accuracy of the working current flowing into the light-emitting device 212, and enhances the display quality of the display panel.

In the above embodiments, the description of each embodiment focuses on different aspects, and parts not detailed in one embodiment can be referred to in the descriptions of other embodiments.

The technical solutions provided in the embodiments of the present application have been described in detail, with specific examples applied to explain the principles and implementation of the application. The descriptions of these embodiments are merely to aid in understanding the technical solutions of this application and its core ideas; those skilled in the art should understand that they can still make modifications to the technical solutions described in the aforementioned embodiments, or equivalently replace some of the technical features; and these modifications or replacements do not depart from the essence of the technical solutions of the embodiments of this application.

What is claimed is:

1. A pixel circuit for connection to a light-emitting device, comprising:

a switch transistor, wherein a first electrode of the switch transistor is connected to a data input terminal;

a driving transistor, wherein a first electrode of the driving transistor is connected to a second electrode of the switch transistor at a first node;

a compensation transistor, wherein a first electrode of the compensation transistor is connected to a second electrode of the driving transistor at a second node, and a second electrode of the compensation transistor is connected to a gate of the driving transistor at a third node; and a calibration module, connected to the compensation transistor and the driving transistor at the second node;

wherein the pixel circuit comprises a compensation phase and a display phase in sequence; during the compensation phase, the calibration module calibrates a potential of the second node, and the compensation transistor compensates a potential of the third node;

wherein the calibration module comprises:

a calibration transistor, wherein a first electrode of the calibration transistor is connected to the second node;

a measuring element, wherein a first switch is disposed between the measuring element and a second electrode of the calibration transistor; and a calibration element, wherein a second switch is disposed between the calibration element and the second electrode of the calibration transistor;

wherein the calibration element is configured to calibrate the potential of the second node to a reference potential, and the measuring element is configured to obtain the potential of the second node.

2. The pixel circuit according to claim 1, wherein during the compensation phase, an operating duration of the first switch is longer than an operating duration of the second switch.

3. The pixel circuit according to claim 1, wherein a pulse width of the compensation phase is greater than a pulse width of the display phase.

4. The pixel circuit according to claim 1, further comprising a first reset transistor, wherein a first electrode of the first reset transistor is connected to a first reset line, a second electrode of the first reset transistor is connected to the third node, and a gate of the first reset transistor is connected to a first control signal line.

5. The pixel circuit according to claim 4, further comprising a second reset transistor, wherein a first electrode of the second reset transistor is connected to a second reset line, a second electrode of the second reset transistor is connected to an anode of the light-emitting device, and a gate of the second reset transistor is connected to a second control signal line.

6. The pixel circuit according to claim 5, further comprising a first light-emitting transistor and a second light-emitting transistor, wherein a first electrode of the first light-emitting transistor is connected to a first potential line, a second electrode of the first light-emitting transistor is connected to the first node, and a gate of the first light-emitting transistor is connected to a first light control line;

a first electrode of the second light-emitting transistor is connected to the second node, a second electrode of the second light-emitting transistor is connected to the anode of the light-emitting device, and a gate of the second light-emitting transistor is connected to a second light control line.

7. The pixel circuit according to claim 6, wherein during the compensation phase, the first light control line controls the first light-emitting transistor to turn on, and the second light control line controls the second light-emitting transistor to turn off;

during a light-emitting period of the display phase, the first light control line controls the first light-emitting transistor to turn on, and the second light control line controls the second light-emitting transistor to turn on.

8. The pixel circuit according to claim 4, wherein a gate of the switch transistor and a gate of the compensation transistor are both connected to a third control signal line;

wherein the first control signal line and the third control signal line transmit different stages of a same type of control signal.

9. A display panel, comprising a pixel circuit for connection to a light-emitting device, wherein the pixel circuit comprises:

a switch transistor, wherein a first electrode of the switch transistor is connected to a data input terminal;

a driving transistor, wherein a first electrode of the driving transistor is connected to a second electrode of the switch transistor at a first node;

a compensation transistor, wherein a first electrode of the compensation transistor is connected to a second electrode of the driving transistor at a second node, and a second electrode of the compensation transistor is connected to a gate of the driving transistor at a third node; and a calibration module, connected to the compensation transistor and the driving transistor at the second node;

wherein the pixel circuit comprises a compensation phase and a display phase in sequence; during the compensation phase, the calibration module calibrates a potential of the second node, and the compensation transistor compensates a potential of the third node;

wherein the calibration module comprises:

a calibration transistor, wherein a first electrode of the calibration transistor is connected to the second node;

a measuring element, wherein a first switch is disposed between the measuring element and a second electrode of the calibration transistor; and a calibration element, wherein a second switch is disposed between the calibration element and the second electrode of the calibration transistor;

wherein the calibration element is configured to calibrate the potential of the second node to a reference potential, and the measuring element is configured to obtain the potential of the second node.

10. The display panel according to claim 9, wherein during the compensation phase, an operating duration of the first switch is longer than an operating duration of the second switch.

11. The display panel according to claim 9, wherein a pulse width of the compensation phase is greater than a pulse width of the display phase.

12. The display panel according to claim 9, further comprising a first reset transistor, wherein a first electrode of the first reset transistor is connected to a first reset line, a second electrode of the first reset transistor is connected to the third node, and a gate of the first reset transistor is connected to a first control signal line.

13. The display panel according to claim 12, further comprising a second reset transistor, wherein a first electrode of the second reset transistor is connected to a second reset line, a second electrode of the second reset transistor is connected to an anode of the light-emitting device, and a gate of the second reset transistor is connected to a second control signal line.

14. The display panel according to claim 13, further comprising a first light-emitting transistor and a second light-emitting transistor, wherein a first electrode of the first light-emitting transistor is connected to a first potential line, a second electrode of the first light-emitting transistor is connected to the first node, and a gate of the first light-emitting transistor is connected to a first light control line;

a first electrode of the second light-emitting transistor is connected to the second node, a second electrode of the second light-emitting transistor is connected to the anode of the light-emitting device, and a gate of the second light-emitting transistor is connected to a second light control line.

15. The display panel according to claim 14, wherein during the compensation phase, the first light control line controls the first light-emitting transistor to turn on, and the second light control line controls the second light-emitting transistor to turn off;

during a light-emitting period of the display phase, the first light control line controls the first light-emitting transistor to turn on, and the second light control line controls the second light-emitting transistor to turn on.

16. The display panel according to claim 12, wherein a gate of the switch transistor and a gate of the compensation transistor are both connected to a third control signal line;

wherein the first control signal line and the third control signal line transmit different stages of a same type of control signal.

17. A pixel circuit for connection to a light-emitting device, comprising:

a switch transistor, wherein a first electrode of the switch transistor is connected to a data input terminal;

a driving transistor, wherein a first electrode of the driving transistor is connected to a second electrode of the switch transistor at a first node;

a compensation transistor, wherein a first electrode of the compensation transistor is connected to a second electrode of the driving transistor at a second node, and a second electrode of the compensation transistor is connected to a gate of the driving transistor at a third node;

a calibration module, connected to the compensation transistor and the driving transistor at the second node; and a first reset transistor, wherein a first electrode of the first reset transistor is connected to a first reset line, a second electrode of the first reset transistor is connected to the third node, and a gate of the first reset transistor is connected to a first control signal line;

wherein the pixel circuit comprises a compensation phase and a display phase in sequence; during the compensation phase, the calibration module calibrates a potential of the second node, and the compensation transistor compensates a potential of the third node.

18. The pixel circuit according to claim 17, wherein the calibration module comprises:

a calibration transistor, wherein a first electrode of the calibration transistor is connected to the second node;

a measuring element, wherein a first switch is disposed between the measuring element and a second electrode of the calibration transistor; and a calibration element, wherein a second switch is disposed between the calibration element and the second electrode of the calibration transistor;

wherein the calibration element is configured to calibrate the potential of the second node to a reference potential, and the measuring element is configured to obtain the potential of the second node.

19. The pixel circuit according to claim 17, further comprising a second reset transistor, wherein a first electrode of the second reset transistor is connected to a second reset line, a second electrode of the second reset transistor is connected to an anode of the light-emitting device, and a gate of the second reset transistor is connected to a second control signal line.

20. The pixel circuit according to claim 17, wherein a gate of the switch transistor and a gate of the compensation transistor are both connected to a third control signal line;

wherein the first control signal line and the third control signal line transmit different stages of a same type of control signal.

* * * * *